United States Patent
Caine et al.

(10) Patent No.: US 9,978,224 B2
(45) Date of Patent: May 22, 2018

(54) METHOD AND APPARATUS FOR DELIVERING AUDIBLE INFORMATION FROM AN ELECTRONIC DEVICE

(71) Applicant: Logitech Europe S.A, Lausanne (CH)

(72) Inventors: Xavier Caine, San Jose, CA (US); Felix Müller, Winterthur (CH); Raymond C. Salas, Livermore, CA (US); Eric Andre Tissot-Dupont, San Francisco, CA (US); Rory Dooley, Redwood City, CA (US); Stephen Dusse, Redwood City, CA (US); Patrick Nicolet, Mountain View, CA (US); Yezhou Wang, San Jose, CA (US); Kevin McLintock, San Mateo, CA (US)

(73) Assignee: LOGITECH EUROPE, S.A., Lausanne (CH)

( * ) Notice: Subject to any disclaimer, the term of this patent is extended or adjusted under 35 U.S.C. 154(b) by 0 days. days.

(21) Appl. No.: 15/287,451

(22) Filed: Oct. 6, 2016

(65) Prior Publication Data
US 2017/0024976 A1 Jan. 26, 2017

Related U.S. Application Data

(63) Continuation of application No. 14/526,412, filed on Oct. 28, 2014, now Pat. No. 9,479,633.
(Continued)

(51) Int. Cl.
*G08B 1/08* (2006.01)
*G08B 3/10* (2006.01)
(Continued)

(52) U.S. Cl.
CPC .......... *G08B 3/1016* (2013.01); *G04G 13/02* (2013.01); *H04M 1/72566* (2013.01)

(58) Field of Classification Search
CPC .......................... G04G 13/02; H04M 1/72566
See application file for complete search history.

(56) References Cited

U.S. PATENT DOCUMENTS 6,678,215 B1 1/2004 Treyz et al.
2006/0153007 A1* 7/2006 Chester .................. G04G 13/02
368/12

(Continued)

*Primary Examiner* — Thomas McCormack
(74) *Attorney, Agent, or Firm* — Patterson & Sheridan, LLP

(57) ABSTRACT

Embodiments of the invention generally include an alarm system and method of using an alarm system to reliably provide an alarm to a user at a desired time or at the occurrence of some desired action. In some embodiments, the apparatus and methods include a media output device that can receive information about an alarm event and then automatically provide an alarm prompt at the time when the alarm event is to occur. In one configuration, a media output device is configured to communicate and synchronize with a portable electronic device, so that a reliable and coordinated delivery of an alarm prompt can be obtained by these devices. Some aspects of the invention may include an apparatus, method and/or computing device software application configured to more easily setup and reliably deliver the alarm signal information to the user using one or more media output devices that are used in combination with an input device.

18 Claims, 5 Drawing Sheets

Related U.S. Application Data

(60) Provisional application No. 61/897,127, filed on Oct. 29, 2013.

(51) Int. Cl.
*G04G 13/02* (2006.01)
*H04M 1/725* (2006.01)

(56) References Cited

U.S. PATENT DOCUMENTS

| | | | |
|---|---|---|---|
| 2007/0297292 A1 | 12/2007 | Kraft et al. | |
| 2010/0195447 A1* | 8/2010 | George | G04G 21/00 368/13 |
| 2012/0196571 A1 | 8/2012 | Grkov et al. | |
| 2013/0106603 A1 | 5/2013 | Weast et al. | |
| 2013/0243235 A1 | 9/2013 | Clayton et al. | |
| 2014/0203944 A1* | 7/2014 | Lombardi | G08B 21/182 340/636.1 |
| 2014/0204718 A1* | 7/2014 | Heinberg | G06Q 10/109 368/47 |
| 2014/0293755 A1 | 10/2014 | Geiser et al. | |

* cited by examiner

METHOD AND APPARATUS FOR DELIVERING AUDIBLE INFORMATION FROM AN ELECTRONIC DEVICE

CROSS-REFERENCE TO RELATED APPLICATIONS

This application is a continuation of U.S. patent application Ser. No. 14/526,412, filed Oct. 28, 2014, which claims the benefit of U.S. provisional patent application Ser. No. 61/897,127, filed Oct. 29, 2013, which are both incorporated herein by reference.

BACKGROUND OF THE INVENTION

Field of the Invention

Embodiments disclosed herein generally relate to an electronic device or electronic devices that are able to reliably provide an alarm or warning to a user at a desired time.

Description of the Related Art

The popularity of portable electronics, such as smart phones, touch pads, PDAs, portable computers and portable music players, has increased dramatically in the past decade. As people have become more reliant on portable electronics they have found more and more uses that reduce the need for more conventional devices, such as digital alarm clocks that are plugged into a power outlet and wind-up alarm clocks. In general, alarm clocks may be used to awaken people who otherwise might over-sleep, preventing them from arriving late for work or other appointments.

Modern digital alarm clocks often feature a radio alarm and/or a buzzing type alarm, allowing a person that is sleeping to be awakened at a predetermined time. The primary use of these conventional clocks is to provide a reminder that it is time to wake up or it is time do some predetermined task. These reminders are typically provided by use of audio sounds, such as music from a radio or an emitted beeping sound. To stop the sound from being emitted, a button or handle on the clock is pressed. While a few conventional digital alarm clocks or other similar wall powered devices are able to deliver web-based music content from providers, such as Pandora® and Spotify®, due to their size and need for power from a wall outlet they cannot be easily shifted from one location to another where the user may reside and are typically not easily setup to play a desired song or audio file when the alarm is desired to sound. Also, if there is a power outage before the alarm reminder is delivered to the user, then the alarm clock, which is the sole device for the delivery of the alarm reminder, will often not be able to deliver the alarm reminder to the user.

Moreover, as the development of software applications that run on today's portable electronic devices have improved, the usefulness and our reliance on these types of portable electronic devices, such as smart phones, tablets and other similar devices have increased. One use of a portable electronic device that has developed in recent years, is the use of the portable electronic device as an alarm clock or general timer. However, portable electronic devices, which are also typically the sole device for the delivery of the alarm reminder, have limitations that make their ability to notify or warn the user that a desired time has been reached or an amount of time has expired is not reliable enough for most users for a number of reasons. One reason is that all portable electronic devices have a finite battery life, and thus their batteries run out of charge rapidly and often unexpectedly. Another common problem found on some portable electronic devices is that some of the devices will not allow some software applications (e.g., non-native programs) to function properly if the software application is running in the background (e.g., program is not "on-top" or the primary program that is running on the device). Thus, in this case, the user will never receive a warning that an alarm time has been reached if the user accidently opens or views another program running on the portable electronic device, since the alarm program is moved into the background. Finally, another common reason is that the operating system or software running on the portable electronic device can become non-functional, thus preventing the portable electronic device from sending the alarm at the appropriate time.

Further, modern smart phones and/or portable music players allow music enthusiasts to listen to music in a wide variety of different environments without requiring access to a wired power source. For example, a battery-operated portable smart phone or music player such as an iPhone® or iPod® is capable of playing music in a wide variety of locations without needing to be plugged in. Conventional portable smart phone and music players are typically designed to have a small form factor in order to increase portability. To improve a user's audio experience it is often desirable to link one or more portable speakers and an audio source, such as a music player or smart phone, together to provide a richer and enveloping audio experience. Due to limitations in standard wireless communication protocols, it is a non-trivial task to setup and control the playback of audio delivered from an audio source, such as a computing device (e.g., music player), which may include an iPod®, iPhone®, iPad®, Android™ phone, Samsung phone, Samsung Galaxy®, Squeeze™ box, or other similar audio delivery enabled computing device.

Therefore, there is need for an electronic device that is able interface with the portable electronic device to help provide a reliable alarm or warning to the user at a desired time and/or also provide a desired audio content to the user when the alarm is delivered to the user. Moreover, there is also a need for a reliable, portable, and personal alarm clock system that has at least two independent components that can be used to reliably awaken a user and to avoid the above-mentioned problems.

SUMMARY OF THE INVENTION

Embodiments disclosed herein generally include an alarm system and method of using an alarm system to reliably provide an alarm to a user at a desired time or at the occurrence of some desired action. In some embodiments, the apparatus and methods include a media output device that can receive information about the alarm event and automatically provide an alarm prompt at the time when the alarm event is to occur. In one configuration, a media output device is configured to communicate and synchronize with a portable electronic device so that a reliable and coordinated delivery of an alarm prompt can be obtained by one or more of these devices.

Embodiments disclosed herein may further provide a method for generating an alarm prompt, comprising forming a communication link between a first media output device and an input device, receiving, at the first media output device, alarm prompt information from the input device, storing the alarm prompt information in a memory of the first media output device and generating an alarm prompt when the time that the alarm event is to occur has been reached. The alarm prompt information may comprise information relating to when an alarm event is to occur in time.

Embodiments disclosed herein may further provide a method for generating an alarm prompt, comprising forming a first communication link between a first media output device and an input device, receiving, at the first media output device, alarm prompt information from the input device, forming a second communication link between the first media output device and a second media output device, sending the alarm prompt information to the second media output device and generating an alarm prompt from the first media output device when the time that the alarm event is to occur has been reached. Similarly, the alarm prompt information may comprise information relating to when an alarm event is to occur in time. The method of generating the alarm prompt may further comprise transmitting a command signal to the input device, wherein the command signal may comprise a "play" command.

Embodiments disclosed herein may further provide an electronic device configured to generate an alarm prompt, comprising a processor, a wireless transceiver that is in communication with the processor, a timing device that is configured to generate time information that is used by the processor, an I/O device structured to provide input to the processor and to receive output signals from the processor, wherein the I/O device comprises a speaker, and a memory having stored therein a number of instructions which, when executed by the processor, causes the electronic device to perform operations comprising forming a first communication link between the electronic device and an input device using the wireless transceiver, receiving alarm prompt information from the input device, wherein the alarm prompt information comprises information relating to when an alarm event is to occur in time, storing the alarm prompt information in memory, and generating an alarm prompt when the time that the alarm event is to occur has been reached using the speaker.

Embodiments disclosed herein may further provide an electronic device configured to generate an alarm prompt, comprising a processor, an I/O device structured to provide input to the processor and to receive output signals from the processor, wherein the I/O device comprises a speaker, a signal comparison device that is configured to measure an electrical characteristic of an audio signal that is delivered to the speaker, and a memory having stored therein a number of instructions which, when executed by the processor, causes the electronic device to perform operations comprising delivering an alarm prompt after a desired amount of time has elapsed, wherein the delivering the alarm prompt comprises delivering a first audio signal to the speaker, receiving an output level signal that is derived from an electrical characteristic of the first audio signal that is measured by the signal comparison device, comparing the output level signal with a desired output level value stored in memory, and adjusting at least one attribute of the delivered first audio signal based on the comparison or delivering a second audio signal based on the comparison.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
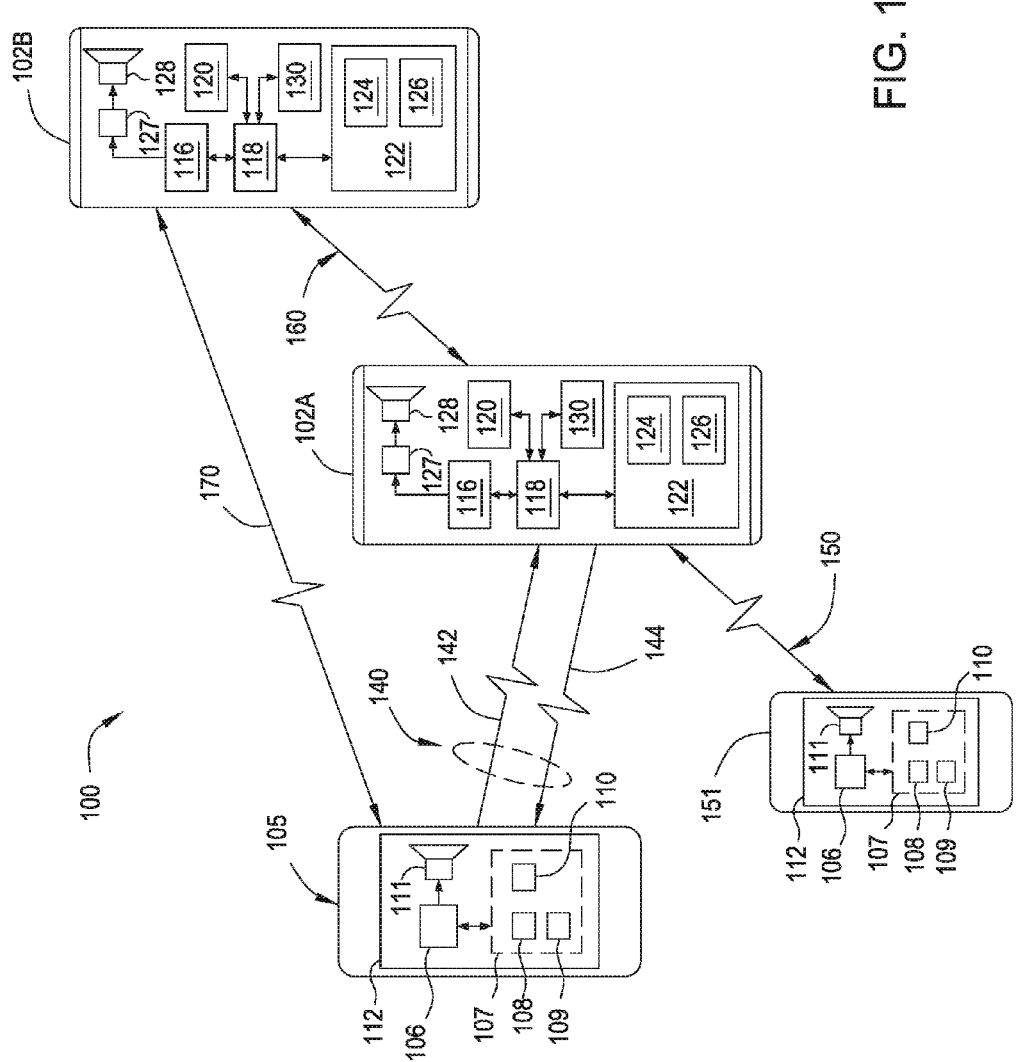
FIG. 1 is a conceptual diagram that illustrates a primary input device, a media output device, an auxiliary media output device and an auxiliary input device that are interconnected using various communication links, according to one embodiment of the present invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments disclosed herein generally include an alarm system and method of using an alarm system to reliably provide an alarm to a user at a desired time or at the occurrence of some desired action or event. The alarm system will generally include a media output device that is able to reliably deliver an alarm prompt to a user, wherein the media output device is separate from an electronic device that is used to initiate and, in some cases, control aspects of the alarm configuration and/or alarm delivery process. Embodiments disclosed herein may also provide the delivery of a desired media data signal, which may include media data, at the time of the delivery of an alarm prompt. In some embodiments, the apparatus and methods include a media output device that can receive information about an alarm event and then automatically provide the alarm prompt at the time when the alarm event is to occur. In one configuration, a media output device is configured to communicate and synchronize with a portable electronic device, so that a reliable and coordinated delivery of an alarm prompt can be obtained by these devices. Some aspects of the invention may include an apparatus, method and/or computing device software application that are configured to more easily setup and reliably deliver the alarm signal information to the user using one or more media output devices.

FIG. 1 is a schematic diagram that illustrates an alarm system 100 that comprises at least one media output device 102A and a primary input device 105. In general, the media output device 102A is an auxiliary computing device that is used in conjunction with primary input device 105. In general, the media output device 102A and a primary input device 105 are able to communicate with each other over a communication link 140.

The media output device 102A may be any technically feasible computing device configured to generate an acoustic output, such as a wireless speaker, wireless ear buds, a portable music player, a keyboard, a tablet computing device, an e-book reader, a smart phone, a television, video monitor or other similar electronic device. In practice, media output device 102A may be battery-operated, although media output devices that receive power from a wall outlet also fall within the scope of the present invention. In general, the media output device 102A may comprise an audio playback device that has the capability of storing, processing and delivering audio information at a desired time based on user input. The media output device 102A may comprise a processor 118 coupled to input/output (I/O) devices 116, a timing device 120, a power source 130 and a memory unit 122. Memory unit 122 may include one or more software applications 124 and stored media data 126. Processor 118 may be a hardware unit or combination of hardware units capable of executing software applications and processing data, which may, for example, include media data and alarm set point information. In some configurations, the processor 118 includes a central processing unit (CPU), a digital signal processor (DSP), an application-specific integrated circuit (ASIC), and/or a combination of such units. Processor 118 is generally configured to execute the one or more software applications 124 and process the stored media data 126, which are each included within memory unit 122. As discussed in greater detail below, in some configurations the media output device 102A may also communicate with a second input device 151, which may be similar to the primary input device 105. In one example, the second input device 151 may be a wireless speaker, a digital music player, a smart phone, a tablet computer, a laptop, a personal computer or other similar device.

The I/O devices 116 are coupled to memory unit 122 and may include devices capable of receiving input and/or devices capable of providing output. For example, I/O devices 116 could include one or more speakers 128 that are configured to generate an acoustic output. Alternatively, I/O devices 116 could include one or more audio ports configured to output an audio signal to an external speaker coupled to the audio ports and configured to generate an acoustic output based on that audio signal. I/O devices 116 may also include one or more transceivers configured to establish one or more different types of wired or wireless communication links with other transceivers residing within other computing devices, such as a transceiver within the I/O device (not shown) within the processing system 106 of the primary input device 105. A given transceiver within I/O devices 116 could establish, for example, a Wi-Fi communication link, near field communication (NFC) link or a Bluetooth® communication link (e.g., BTLE, Bluetooth classic), among other types of communication links.

In some embodiments, the I/O devices 116 may include an audio signal comparison device 127 that is adapted to detect an audio signal, which may be part of media data file, that is being delivered to at least one speaker 128 in the media output device 102A. In some embodiments, the audio signal comparison device 127 comprises analog or digital circuits that are able to measure an electrical characteristic of signal flowing through the audio circuits that are configured to deliver the audio signal to the speaker 128. The measured electrical characteristic may include the measurement and/or detection of the amount of power, voltage and/or current flowing through the audio circuits within the I/O device 116. The audio signal comparison device 127 may also include one or more analog or digital comparison circuits (e.g., OP Amps), and at least one feedback circuit that is able to provide the processor 118 with information about the audio signal being delivered to the speaker 128. In one example, the comparison device 127 is able to determine if an audio signal that is being delivered by the speaker 128 is less than or greater than a desired output level (e.g., power level, volume level). The desired output level may be a constant that is stored in memory 122 of the media output device 102A. In some embodiments, the audio signal comparison device 127 may comprise, or at least additionally comprise, a device that is able to detect and measure the sound pressure level delivered by the speaker 128 to assure that an audio signal has been delivered and at what sound level it was delivered to a user.

The timing device 120 generally comprises a device that is able to reliably measure and provide input to the processor 118 regarding the passage of time. In one embodiment, the timing device is an accurate real time clock that is able to accurately measure the time and provide time related updates to the processor 118. However, in some embodiment, it is desirable from a cost and complexity perspective that the timing device 120 be a simple count down timer that may include an oscillator and flip/flop circuits that are able to measure the passage of time and deliver a signal to the processor 118.

Memory unit 122 may be any technically feasible type of hardware unit configured to store data. For example, memory unit 122 could be a hard disk, a random access memory (RAM) module, a flash memory unit, or a combination of different hardware units configured to store data. Software application 124, which is stored within the memory unit 122, includes program code that may be executed by processor 118 in order to perform various functionalities associated with the media output device 102A.

The stored media data 126 may include any type of information that relates to an alarm prompt that is to be delivered at a desired time by the media output device 102A. The alarm prompt is also referred to herein as an output signal. In some cases, the stored information may include media data, such as a media file which may include at least a portion of an audio file, such as an MP3 file, Windows Media Audio (WMA) file, Advanced Audio Coding (AAC) file, WAV file, Ogg Vorbis file, Free Lossless Audio Codec (FLAC) file or a waveform. In some embodiments, the media data may include a video clip (e.g., analog data files, digital containing files (e.g., MPEG file)), audio/video file and/or other similar audio and/or visual files. In one embodiment, media data is derived from a cloud-based source, such as Pandora® Internet Radio. The software application 124 may generate audio and/or video signals based on the stored media data 126. Media output device 102A may then generate an acoustic output, such as the alarm prompt based on the received media data signals. The stored media data 126 may reflect various data files, settings and/or parameters associated with the acoustic and/or visual output of portable media output device 102A. For example, stored media data 126 could include media data files (e.g., stored digital media files, audio files, alarm sounds), equalization settings, volume settings, sound modulation settings, a low-frequency cutoff parameter, a crossover cutoff parameter and so forth. As mentioned above, software application 124 may configure media output device 102A based on stored media data 126.

The primary input devices 105, which are well known in the art, can be any type of computing device, such as a cell phone (e.g., smart phone), a digital music player, a tablet computer, a laptop or other similar device. Examples of primary input devices 105 may include, but are not limited to an iPod®, iPhone®, iPad®, Android™ phone, Samsung phone, Samsung Galaxy®, Squeeze™ box, Microsoft Surface® or other similar device. The primary input device 105 may comprise a processing system 106 and memory 107, which may contain stored data 108 and one or more software programs, such as programs 109 and 110. The processing system 106 will typically comprise a central processing unit (CPU), a digital signal processor (DSP), application-specific integrated circuits (ASIC), an input/output (I/O) device, a visual display, a timing device and other useful components. I/O devices within the primary input device 105 may include a speaker 111 and/or one or more transceivers configured to establish a wired or wireless communication link with other transceivers residing within other computing devices, such as a transceiver within the media output device 102A. While the primary input device 105 may also include audio playback capability via an input device speaker 111, this configuration is not intended to be limiting as to the scope of the invention described herein, since the primary input device 105 need not have this capability to work with one or more of the embodiments of the invention described herein.

Figure 5:
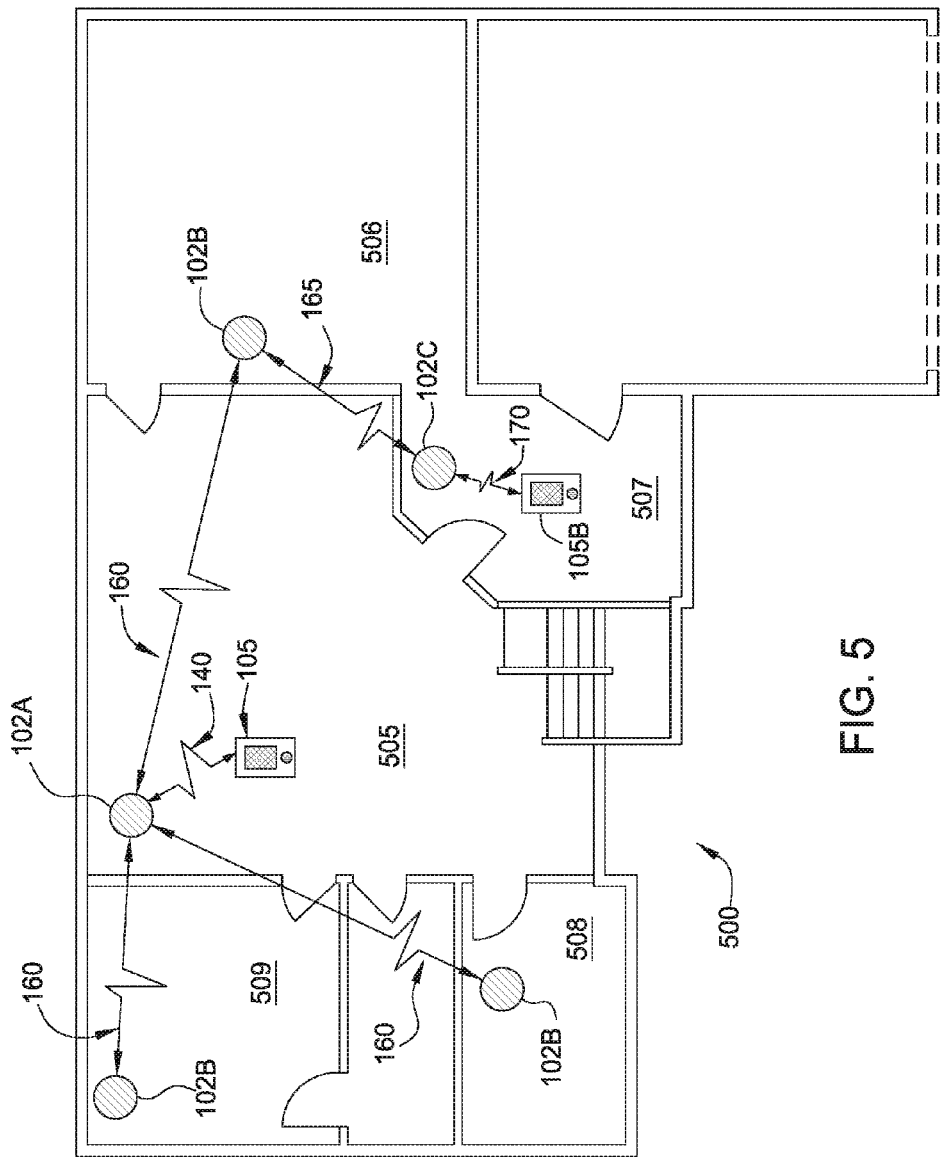
FIG. 5 illustrates a top view of building that contains a primary input device, a media output device and four auxiliary media output devices that are disposed in different rooms of the building, according to one embodiment of the present invention.

In some embodiments, to improve a user's audio experience, improve the reliability of the alarm system and/or provide an alarm prompt to a user that is a distance away from media output device 102A, it is desirable for the alarm system 100 to also include one or more auxiliary media output devices 102B and 102C (FIG. 5). While not intending to limit the scope of the invention described herein, in some configurations the auxiliary media output devices 102B and 102C are the same type of device as the media output device 102A, discussed above. In one example, the media output device 102A and the auxiliary media output devices 102B and 102C are an Ultimate Ears Boom™ by Logitech Europe S.A. The auxiliary media output device 102B is adapted to communicate with the media output device 102A via a link 160 and/or the primary input device 105 via a link 170. The links 160, 165 and/or 170, which are shown in FIG. 5, may include wired or wireless links that allow the auxiliary media output devices 102B and/or 102C to communicate with media output device 102A and/or a primary input device 105.

Alarm System and Method Examples

Figure 2:
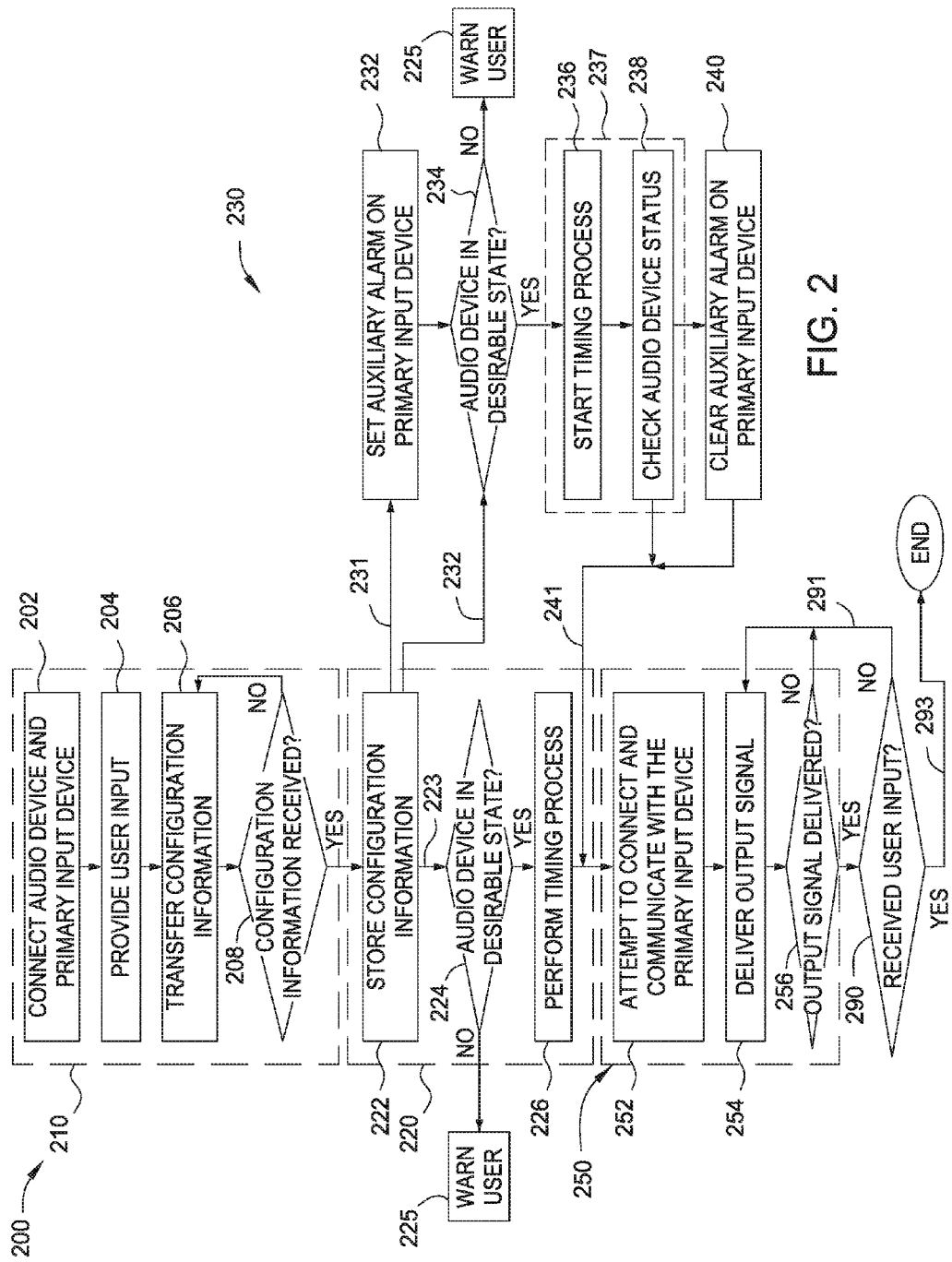
FIG. 2 is a flow diagram of a method of configuring, timing and delivering an alarm to a user at a desired alarm event time, according to one embodiment of the present invention.
Figure 3:
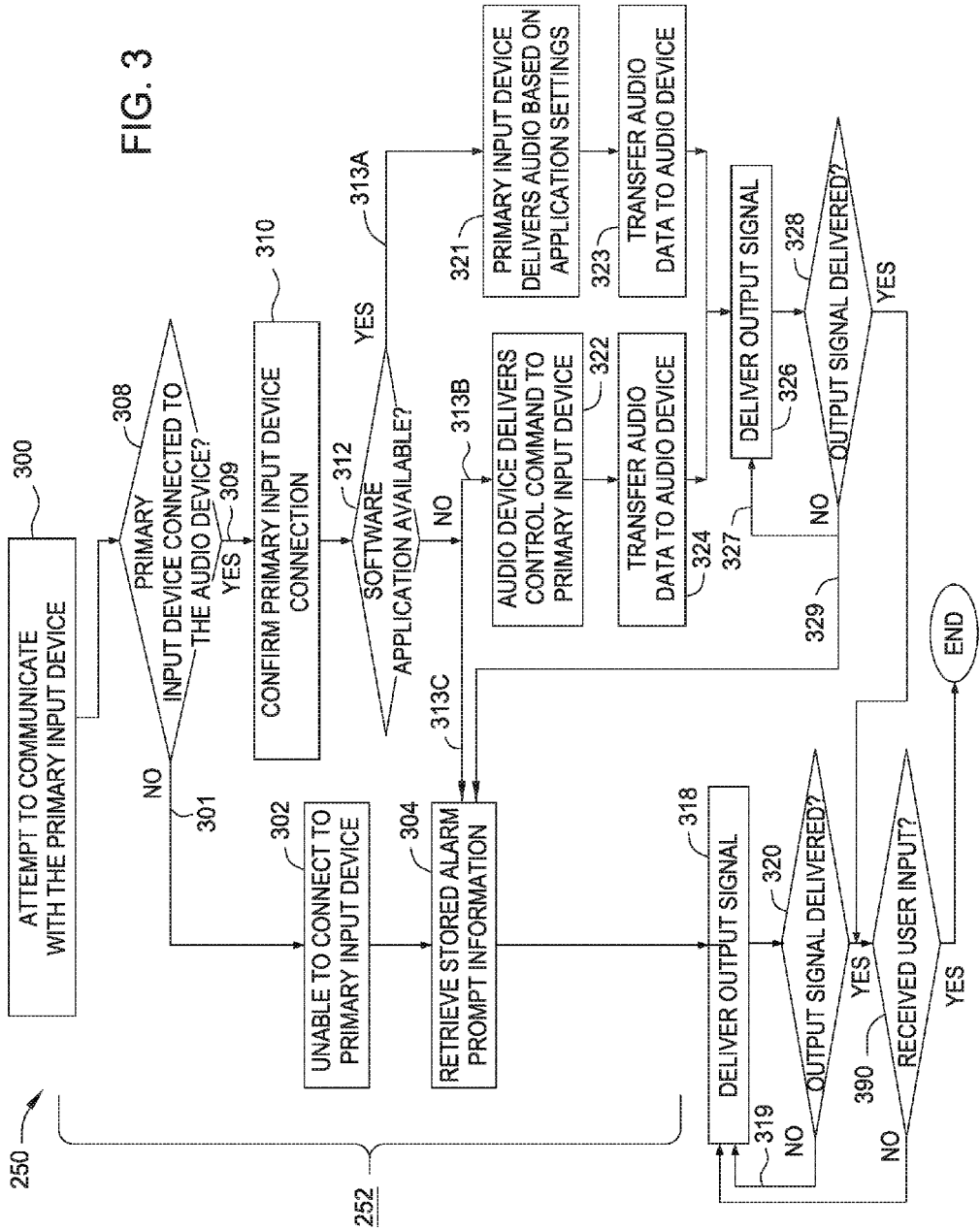
FIG. 3 is a flow diagram of a method of reliably delivering an alarm to a user at a desired alarm event time, according to one embodiment of the present invention.
Figure 4:
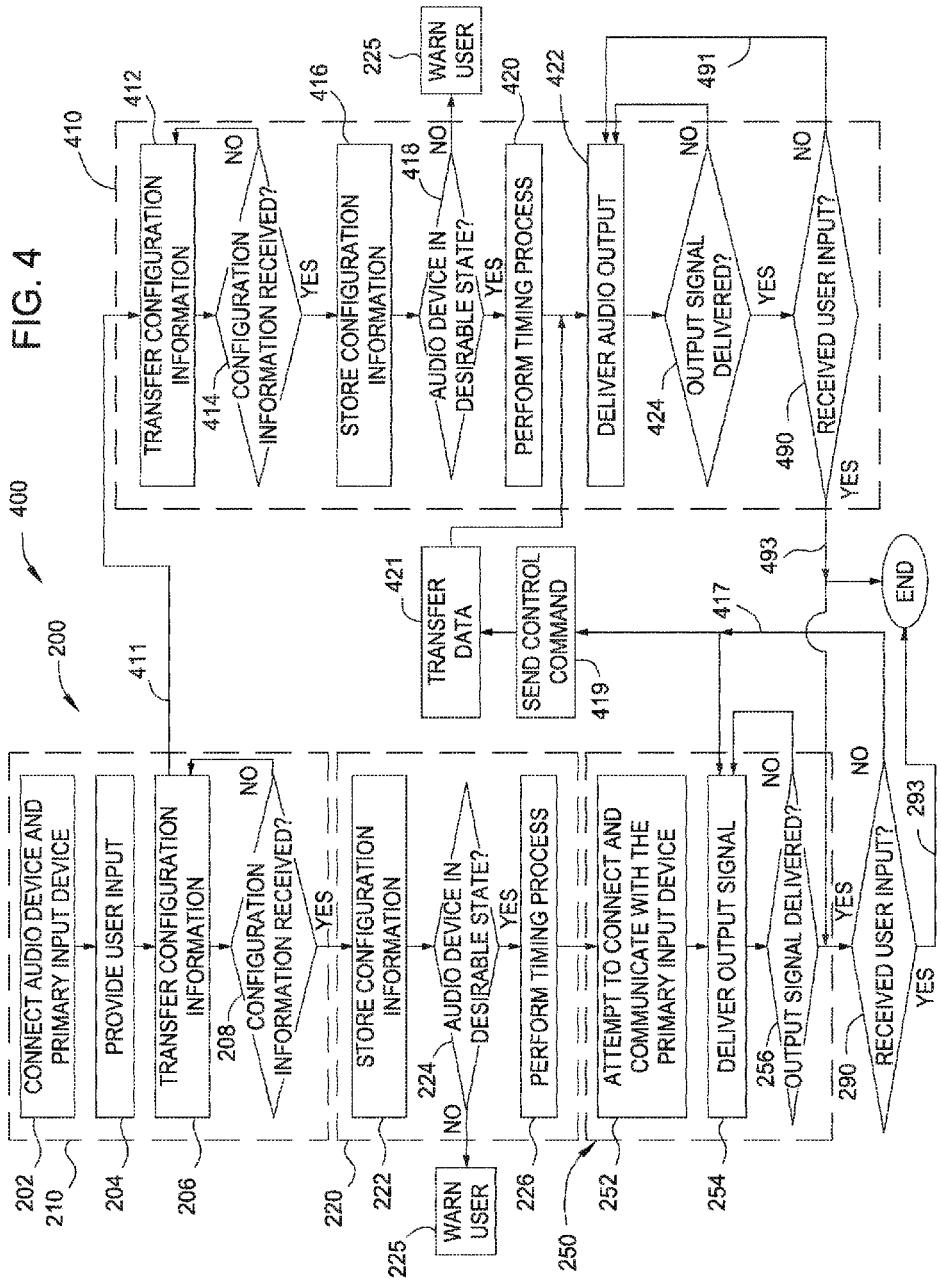
FIG. 4 is a flow diagram of a method of configuring, timing and delivering an alarm to a user at a desired alarm event time using a media output device and one or more auxiliary media output devices, according to one embodiment of the present invention.

FIGS. 2-4 illustrate examples of one or more processes, or parts of a process, that can be performed by an alarm system 100 to reliably provide an alarm prompt to a user at a desired time. These methods can be provided to deliver a primary alarm prompt or at least a back-up or redundant alarm prompt to assure that the user reliably receives the desired notification when a time related event has occurred, such as an alarm event.

FIG. 2 illustrates a process sequence 200 that is adapted to deliver the primary alarm prompt to a user when a time related event has occurred. In general, the process sequence 200 includes a configuration process 210, a timing process 220 and an alarm deliver process 250. The configuration process generally includes one or more steps that are used to configure the media output device 102A and a primary input device 105 so that an alarm prompt can be delivered to a user when a desired time related event has occurred. At step 202, the configuration process 210 starts with the input device 105 and media output device 102A initiating communication with each other via the link 140. The communication link may be performed via a wired or wireless communication technique (e.g., Bluetooth classic, BTLE). In one example, step 202 may include the initial pairing process commonly performed by wireless portable electronic devices to allow them to securely communicate with each other.

Next, at step 204, the user inputs information relating to the time related event, or also referred to herein as the "alarm event time," into the program 109 that is running on the primary input device 105. The user's input may be provided to parts of the software program 109 that are displayed on a graphical user interface (GUI) 112 (FIG. 1) on the primary input device 105. The information input by the user may be stored in the memory 108 of the primary input device 105. Typically, the user provided information will include the time that the alarm is to occur and information relating to the alarm prompt that is to be provided by the media output device 102A and/or the primary media output device 105 at the alarm event time. In one example, the alarm prompt information includes the selection of an audio file that is to be played when the alarm prompt is delivered (e.g., user's favorite song (e.g., MP3 file), common alarm sound, etc.), selection of a type of optical or physical prompts (e.g., pictures to be displayed, vibration notification prompts) that are to be played when the alarm prompt is delivered, how many times the alarm prompt is to be repeated, how long the alarm prompt is to be played, the current time information, what additional applications are to be started or used in conjunction with the software program 109 on the primary media output device 105 and other control parameters that are to be used by the media output device 102A (e.g., alarm volume). In one embodiment of the process sequence 200, step 204 may be performed prior to step 202. In this case, the user may input the desired alarm prompt information into the primary input device 105 prior to the primary input device 105 and media output device 102A establishing the communication link 140.

At step 206, the primary input device 105 then delivers at least a portion of the alarm prompt information provided by the user to the media output device 102A via the wired or wireless delivery link 142, which is part of communication link 140. In one configuration, the transfer of the alarm prompt information is initiated by the user input provided to the software program 109 running on the primary input device 105. In one example, the transferred information includes the alarm prompt information, such as an audio file, current time and/or other control parameters that are to be used by the media output device 102A and information regarding when the alarm event is to occur.

Next, at step 208, the software program 109 running on the primary input device 105 may then optionally send a command to the media output device to assure that the information transferred in step 206 was received and/or it is stored within the memory 122 of the media output device 102A. During this step the media output device 102A may perform some internal checks to assure that the received information and active components in the device (e.g., processor, memory) are in a desirable state. The primary media output device 105 may receive the confirmation via a signal delivered via the wired or wireless return link 144, which is part of the communication link 140. Confirmation may also be provided to the user by the delivery of an audio signal delivered through the speaker 128 of the media output device 102A. If the confirmation is not received, then the primary input device 105 may optionally revert back to step 206 and/or provide a warning to the user via the display of the primary input device or audio signal to the user via the speaker 111. If the confirmation signal is received then the process sequence 200 will continue to the timing process 220 portion of the process sequence 200.

In general, the timing process 220 is then initiated after performing the configuration process 210, and includes the following steps performed by the media output device 102A to correctly provide an alarm prompt at a desired time to the user. The timing process 220 includes step 222 in which the information received during step 206 is stored within the memory 122 of the media output device 102A. While not intended to be limiting as to the scope of the invention provided herein, in some embodiments, step 222 may begin during step 206 and may be completed before step 208 is performed by the primary input device 105. In some cases, the information received during step 206 is stored as part of the stored media data 126 within the memory 122 of the media output device 102A. However, in some cases the stored media data 126 may also include hard coded or other stored information provided by the user or media output device manufacturer relating to various attributes of the media output device 102A (e.g., paring information, EQ settings, etc.).

The process sequence 200 may then follow path 223 at which time the optional step 224 is performed. In step 224, the processor 118 determines if the media output device 102A is in a desirable state to perform at least part of the process sequence 200. In general, the media output device 102A will be determined to be in a "desirable state" if it is determined that the batteries in the power source 130 have enough power to perform the media output device's part of the process sequence 200 and the hardware (e.g., I/O devices 116) and software application 124 in the media output device 102A are functioning correctly. In one example, the processor 118 uses information received from a sensor (not shown) within the power source 130 to determine the current amount of stored power within the batteries (e.g., Amp-hrs (Ah)) and optionally information on the power draw rate(s) of the media output device 102A, which may be stored in memory 122, to determine whether there is enough power to complete the tasks performed during this and subsequent steps. In one example, the sensor is adapted to measure the amount of charge stored in the batteries found in the power source 130. If it is determined that the media output device 102A is not in a desirable state (e.g., batteries are low) a user warning 225 may be displayed on the GUI of the primary input device 105, or on the media output device 102A's GUI if it has one, or an audible warning may be supplied by the media output device 102A and/or primary input device 105. If it is determined that the media output device 102A is in a "desirable state" then the process sequence 200 will continue on to step 226.

At step 226, the processor 118 and timing device 120 work together to perform the task of determining when a desirable amount of time has passed and an alarm prompt needs to be generated. The determination of when a desirable amount of time has passed is based on the alarm prompt information that was received by the media output device 102A during step 206. In one example, the timing process performed in step 226 includes the act of counting down from the time that the alarm prompt information is received to an alarm event time, which was received during step 206. In some configurations, the alarm event time (e.g., 6:00 am wake-up time) and the actual time residing on the primary input device 105 (e.g., 8:05 pm which is the time when the alarm prompt was transferred in step 206) are transferred to the media output device 102A so that the actual count down time can be calculated (e.g., 9 hours and 55 minutes) and counted-down during step 226. In another configuration, for example, the amount of time (e.g., 9 hours and 55 minutes) that the media output device needs to count down from, or in other words measure, is calculated by the software program 109 running on the primary input device 105 and then is transferred to the media output device 102A during step 206. In some cases, step 226 may begin during step 206 or a short time after its completion.

After completing the timing process 220, the processing sequence 200 will then continue on to the alarm deliver process 250, in which the alarm prompt is delivered by media output device 102A. In some configurations, the alarm prompt may also be delivered through the primary input device 105 and/or and auxiliary media output device 102B, as will be further discussed below. The alarm deliver process 250 typically starts at step 252, in which the media output device 102A attempts to connect with the primary input device 105, after step 226 has been completed or nearly completed, so that information relating to the alarm event can be shared by the media output device 102A and primary input device 105. In general, step 252 will start with a connection signal being sent across the return link 144 from the media output device 102A, after which one or more communication signals may be sent in either direction between the media output device 102A and the primary input device 105 across the link 140 using one or more communication protocols (e.g., BTLE). An example of some of the communication signals that may be transferred between the media output device 102A and the primary input device 105 across the link 140 is further described in conjunction with FIG. 3 below. However, in general, step 252 will include the processor 118 determining what information is to be delivered at the time when the alarm prompt is to be generated, based on the communication that occurs between the media output device 102A and the primary input device 105 during this step, which is also described further below.

After the processor 118 has determined what information is to be delivered and the alarm event time has been reached, the media output device 102A will deliver the alarm prompt during step 254. As outlined above, the alarm prompt may include the delivery of media data (e.g., mp3 file, a WAV file), such as the favorite song selected by the user in the user input step 204, media data delivered from a stored alarm sound file found in memory 122, and/or optical or physical prompts (e.g., pictures to be displayed, mechanical vibration prompts provided by mechanical components in the media output device 102A).

Next, at step 256, the media output device 102A will optionally confirm that the alarm prompt has or is being delivered by the one or more components (e.g., speaker 128) in the media output device 102A. In one example, as discussed above, the confirmation that the alarm prompt is or has been delivered is performed by use of the audio signal comparison device 127 that is adapted to determine that the alarm prompt is being delivered at a desired volume level by measuring the amount of power, voltage and/or current flowing through the audio circuits within the I/O devices 116 that are configured to deliver the signal to the speaker 128. If the alarm prompt is not delivered, or is not delivered in a desired way (e.g., volume is too low), then the process sequence 200 may revert back to step 254 and/or one or more audio output parameters (e.g., volume, media data selection) may be automatically adjusted by the processor 118 to assure that the alarm prompt is delivered to the user in a desired way. One will note that the settings for the delivery of the alarm prompt can be hard coded into the memory 122 at the factory and/or can be provided to the media output device 102A by the user during the configuration process 210.

However, if the alarm prompt is delivered in a desired way, then the process sequence 200 may end, or as shown in FIGS. 2-4, the process sequence 200 may continue until input from the user has been received (step 290). Input from the user may include providing input to the media output device 102A, such as pressing an "alarm off" button (not shown) or power button (not shown), or providing input to the primary input device 105, such as providing input to the software program 109 running on the primary input device 105. If user input is not delivered in a desired period of time, then the process sequence 200 may revert back to steps 254 and 256. If user input is received, then the process sequence 200 may end.

Alternate Timing Process Sequences

In some embodiments, the timing process 220 may be replaced by a modified timing process sequence 230 that contains one or more additional steps to further assure that the alarm prompt is reliably delivered to the user at the desired alarm event time. In one example, the modified timing process 230 includes a configuration information storing step (step 222), a step to determine if the media output device is in a desirable state (step 234), and a modified timing process step 237. In one embodiment, the configuration information storing step and the step to determine if the media output device is in a desirable state step are the same as steps 222 and 224, respectively, and thus will not be repeated herein. In this case, after performing step 222 the process sequence 200 will continue to step 234 following path 232, at which time the process(es) outlined above in step 224 will be performed before the sequence continues to the modified timing process step 237.

The modified timing process step 237 may include a timing sequence initiation step, or step 236, and a media output device status check step, or step 238. The modified timing process step 237 is generally performed using the processor 118 and timing device 120 to generate an alarm prompt when a desired amount of time has passed. In step 236, the timing process is initiated after the desired alarm event time has been calculated or received by the media output device 102A, as similarly discussed above in conjunction with step 226.

Next, at step 238, a regular or continual check on the status of the media output device 102A is performed during the modified timing process 237 to make sure that the media output device 102A will be able to complete the alarm event timing process. In one example, the check will determine if the media output device 102A is in a desirable state, such as the check will determine if the batteries have enough battery power to complete the task and/or the hardware (e.g., I/O devices 116) and other parts of the software application 124 are functioning correctly. In one example, the processor uses information received from a sensor (not shown) within the power source 130 to determine the amount of stored power within the batteries (e.g., Amp-hrs (Ah)) and optionally a measured or an updated power draw rate of the media output device 102A to determine whether there is enough power to complete the tasks performed during this step. In one embodiment, if it is determined that the media output device 102A is not in a desirable state and/or it will not be able to complete the required tasks in step 238, the process sequence 200 will immediately proceed on to the alarm deliver process 250 by following path 241. In another embodiment, if it is determined that the media output device 102A is not in a desirable state and/or it will not be able to complete the required tasks in step 238, a user warning may be immediately displayed on the GUI of the primary input device 105, or on the media output device's 102A GUI if it has one, or an audible warning may be supplied by the media output device 102A and/or primary input device 105. However, if it is determined that the media output device 102A is or will be able to complete the required tasks in step 238 and the alarm event time has been reached, the process sequence 200 will then proceed on to the alarm deliver process 250 by following path 241.

In another embodiment, the modified timing process sequence 230 may further include a set auxiliary alarm on primary input device step (step 232) and a clear auxiliary alarm on primary input device step (step 240). Steps 232 and 240 are provided within the processing sequence 200 to help further assure that the alarm prompt is delivered to the user at the desired alarm event time. In this alternate process sequence, after performing step 222 the process sequence 200 will continue to step 232 following path 231. At step 232, the software application 109 running on the primary input device 105 and/or components within the media output device 102A communicate with the processing system 106 to set an auxiliary alarm (e.g., second alarm) at the desired alarm event time in a second software application 110 running on the primary input device 105. In one example, a command is sent via the return link 144 to the primary input device 105 from the media output device 102A, and includes the required information to set the auxiliary alarm in the second software application 110 at the desired alarm event time. The auxiliary alarm is thus configured to provide a redundant alarm that is able to provide an alarm prompt to the user from the primary input device 105 if the media output device 102A is unable to deliver the alarm prompt. In some configurations, it is desirable that the second software application 110 be a "native" software program that is able to run in the background and provide input to the user, even when it is not the primary program that is running on the device (e.g., not running "on-top"). In that way, an additional alarm can be provided to the user to assure that the alarm prompt has been received after the timing process steps have been completed.

Next, after performing step 232, the process sequence 200 will continue to and complete steps 234 and 237, as outlined above. If it is determined that the media output device 102A is able to complete the required tasks in step 238 of step 237 and the alarm event time is about to be reached, the timing process sequence 230 will then optionally proceed on to step 240. At step 240, in an effort to prevent competing alarm prompts from being received by the user, such as the alarm prompt that is to be delivered by the media output device 102A based on the alarm deliver process 250 and the alarm prompt provided by the second software application 110 running on the primary input device 105, the media output device 102A will send a command to the primary input device 105 to clear the auxiliary alarm just prior to the alarm prompt being delivered by the media output device 102A. In one example, the processor 118 causes a command signal to be delivered to the primary input device 105 about 30 seconds or less before the alarm event time. However, the amount of time prior to the alarm event time that the command signal is sent may depend on the speed with which the communication can be established between the devices and the time it takes to clear the alarm from the second software application 110. After completing step 240, the process sequence 200 will then proceed on to the alarm deliver process 250 by following path 241.

Alarm Delivery Process Sequence

FIG. 3 illustrates an example of the alarm delivery process 250 that is performed after the completion of the timing process 220, according to one embodiment of the invention disclosed herein. In this embodiment, the alarm delivery process 250 begins at step 252, which includes at least some of the processes previously discussed above. Step 252 starts with step 300 in which the processor 118 causes the delivery of a connection signal across the return link 144 to initiate the communication between the media output device 102A and the primary input device 105 from the media output device 102A.

Next, at step 308, the processor 118 determines whether a two way communication link, such as link 140, can be created between the media output device 102A and the primary input device 105. If a communication link cannot be established between the media output device 102A and the primary input device 105, the process sequence 200 will then follow path 301 to step 302. However, if a communication link can be established between the media output device 102A and the primary input device 105, the process sequence 200 will then follow path 309 to step 310.

Therefore, if the communication link cannot be established during step 308 then step 302 is performed. In this step, the processor 118 is used to determine that a communication link cannot be established with the primary input device 105, and thus the information received during the configuration process 210 and/or stored in the memory of the media output device 102A needs to be used to provide the alarm prompt to the user.

After performing step 302, the processor 118 then retrieves the stored alarm prompt information from the memory 122 and delivers the information to the media output device 102A components that are configured to subsequently perform steps 318 and 320. In one example, retrieved audio information includes one or more audio files that were transferred to the media output device during the configuration process 210 and other alarm prompt information that are required to perform the alarm prompt delivery sequences found in steps 318 and 320. In another example, if no audio files were transferred to the media output device during the configuration process 210 or the audio files are found to be corrupt or found to be inaccessible, the processor will then use a default audio file and other alarm prompt information stored in memory 122 to generate an alarm prompt during steps 318 and 320.

After the processor 118 has retrieved the desired information, determined what information is to be delivered during the alarm event and the alarm event time has been reached, the media output device 102A then delivers the alarm prompt during step 318. As outlined above, the alarm prompt may include the delivery of media data (e.g., MP3 file, a WAV file), such as the user's favorite song that was retrieved during step 304, media data delivered from a stored alarm sound file found in memory 122, and/or optical or physical prompts.

Next, at step 320, the media output device 102A will optionally confirm that the alarm prompt has or is being delivered by the one or more components (e.g., speaker 128) in the media output device 102A. In one example, as discussed above in conjunction with step 256, the confirmation that the alarm prompt is or has been delivered may be performed by use of the audio signal comparison device 127. If the alarm prompt is not delivered, or is not delivered in a desired way (e.g., volume is too low), then the process sequence 200 may revert back to step 318 (see path 319) and/or one or more audio output parameters (e.g., volume, media data selection) may be automatically adjusted by the processor 118 to assure that the alarm prompt is delivered to the user in a desired way. One will note that the settings for the delivery of the alarm prompt can be hard coded into the memory 122 at the factory and/or can be provided to the media output device 102A by the user during the configuration process 210.

If the alarm prompt is delivered in a desired way, then the alarm delivery process 250 may end, or the alarm delivery process 250 may continue until an input from the user has been received (step 390). In general, step 390 is the same or similar to step 290, which is discussed above. Input from the user may include providing input to the media output device 102A, such as pressing an "alarm off" button (not shown) or power button (not shown), or providing input to the primary input device 105, such as providing input to the software program 109 running on the primary input device 105. If user input is not delivered in a desired period of time, then the alarm delivery process 250 may revert back to steps 318 and 320. If user input is received, then the alarm delivery process 250 may end.

Referring back to FIG. 3, if a communication link can be established during step 308 then alarm delivery process 250 will proceed on to step 310. In this step, the processor 118 is used to determine, using one or more wireless communication protocols, whether the communication link established in step 308 is with the primary input device 102A and not with an auxiliary media output device 1026 (FIG. 1). If the communication link is established with an auxiliary input device 151, then the media output device will then attempt to establish a separate communication link with the primary input device 105.

However, if a communication link is formed between the media output device 102A and primary input device 105, then the alarm delivery process 250 proceeds on to step 312 in which the processor 118 determines if the software application 109 in the primary input device 105 is available. In one configuration of the alarm system 100, the software application 109 includes a portion of the software program that is adapted to provide additional alarm prompt information to the media output device 102A when a communication link is formed. The additional information may include the user's current favorite song or information regarding the last played song on the primary input device 105. In one configuration, one portion of the software application 109 is adapted to configure the media output device 102A, as discussed above in conjunction with step 210. In some configurations, the software application 109 comprises two separate software applications, where one software application is used to configure the media output device 102A and one software application is adapted to provide alarm status information and/or additional alarm prompt information when needed. The processor 118 typically determines that the software application 109 is available when it is able to communicate with the software application 109 and the software application 109 can be made the primary program that is running on the primary input device (running "on-top"), so that any updates to the alarm prompt information and/or other configuration information can be retrieved and delivered to the media output device 102A.

If it is determined that the software application 109 is available, the alarm delivery process 250 then will proceed to step 321 by following path 313A shown in FIG. 3. In step 321, based on a signal received from the media output device 102A during steps 300 and 308, the software application 109 and/or processing system 106 in the primary input device 105 determine that a communication link has be established with the media output device 102A, and then determine what alarm prompt information needs to be delivered to the media output device 102A. The alarm prompt information that is collected by the software application 109 and/or processing system 106 may include at least part of the user input information retained from the configuration process 210 and any updates that have been provided by the user. In one example, the user input provided during the configuration process 210 may include the user's preference to deliver the audio file that was last played on the primary input device 105 or deliver the user's favorite song when the alarm prompt is delivered by the media output device 102A. The updated alarm prompt information, which may be stored in the memory of the primary input device 105, may include updated audio file information, media output device 102A settings (e.g., volume, EQ settings), updated alarm prompt delivery settings (e.g., length of time to deliver alarm prompt) and other useful alarm prompt delivery settings.

Next, at step 323, the software application 109 and processing system 106 retrieve the desired alarm prompt information from the memory 107 and deliver the information to the media output device 102A, which is configured to subsequently perform steps 326 and 328. In this step, the primary input device 105 delivers the alarm prompt information via the wired or wireless delivery link 142, which is part of communication link 140. In one example, the retrieved alarm prompt information includes one or more audio files that were transferred to the media output device 102A during the configuration process 210 completed by the user and other information that is used to aid in the alarm prompt delivery sequences found in steps 326 and 328.

After the media output device 102A has received the information transferred during step 323 and the alarm event time has been reached, the media output device 102A then delivers the alarm prompt during step 326. During this step, the processor 118 will also determine what information is to be delivered during the alarm event based on stored information and/or the newly received alarm prompt information. In general, step 326 generally contains all of the features found in step 318, which is discussed above. The delivered alarm prompt will be delivered following the instructions provided to the media output device 102A during step 326 and any other additional information that is necessary to the delivery of the alarm prompt that is retained in memory 122.

Next, at step 328, the media output device 102A will optionally confirm that the alarm prompt has or is being delivered by the one or more components (e.g., speaker 128) in the media output device 102A, as discussed above in conjunction with step 256 or step 320. If the alarm prompt is delivered in a desired way, then the alarm delivery process 250 may end, or the alarm delivery process 250 may continue until an input from the user has been received (step 390), as discussed above. If user input is not delivered in a desired period of time, then the alarm delivery process 250 may revert back again to step 326 and then step 328 via path 327.

In one embodiment, if the alarm prompt is not delivered in a desired way during steps 326 and 328, then the process sequence 200 may revert back to step 326 (path 327) and then one or more audio output parameters (e.g., volume, media data selection) may be automatically adjusted by the processor 118 to assure that the alarm prompt is delivered to the user in a desired way. However, if the alarm prompt is not delivered in a desired way a second time, then the alarm delivery process 250 may continue on to steps 304, 318 and 320 (see path 329), at which time these previously discussed process steps are completed. In this case, if the processor 118 determines that the transferred alarm prompt information is unable to be played for any reason (e.g., audio file is corrupt, audio file is blank), then the alarm prompt information stored within the media output device 102A can be used in the place of the unusable information received during steps 323. Separately, one will note that the alarm delivery process 250 may follow path 329 without first following path 327.

Referring back to FIG. 3, if it is determined that the software application 109 is not available, the alarm delivery process 250 may then proceed to step 322 by following path 313B. In step 322, the processor 118 and/or software application 124 determine that a communication link has been established with the media output device 102A, and then determine that the software application 109 is not responding or is not available for use, due to the transfer of one or more communication signals or the lack of a communication signal being sent across the communication link 140 by one or more components in the processing system 106. If it is determined that the software application 109 is not responding or is not available, then the processor 118 will send a control command to the primary input device 105 to cause one or more software applications stored within the memory 107 of the primary input device 105 to cause an alarm prompt to be delivered to the media output device 102A during step 324. The one or more software applications generally include software programs that are able to deliver audio information to the media output device 102A during step 324, which are used to form the alarm prompt.

In one embodiment, the control command delivered during step 322 is a "play" command, which causes the primary input device 105 to deliver media data, such as audio content, to the media output device 102A via the communication link 140 during step 324. In some cases, audio content is delivered to the speaker 111 in the primary input device 105 during step 324. In one example, the one or more software applications found within the primary input device 105 is a music playing program, such as iTunes®, Spotify® or Google Play™, which is adapted to play audio files on the primary input device 105 and/or media output device 102A when the control command is received by the primary input device 105. In one example, the delivery of the control command includes delivering instructions to access a specific media streaming service (e.g., Pandora®) to provide the streaming content as the alarm prompt. The alarm prompt information (e.g., audio content) is then transferred to the media output device 102A using the communication link 140, based on the delivered "play" command. In one example, the delivered alarm prompt information includes audio content that comprises at least a portion of a media file that is transferred to the media output device 102A from the primary input device 105. In another example, the delivery of the control command includes delivering instructions to play a specific audio file or playlist stored on the primary input device 105.

After the media output device 102A has received the information transferred during step 324 and the processor 118 has determined what information is to be delivered during the alarm event, and the alarm event time has been reached, the media output device 102A then delivers the alarm prompt during step 326. After performing step 326, the media output device 102A will then perform step 328, and any other additional steps if needed (e.g., step 304, 318, 320 and/or 390), as discussed above.

If it is determined that the software application 109 is not available, the alarm delivery process 250 may then proceed to steps 304 by following path 313C, so that steps 304, 318, 320 and 390 can then be completed. In this configuration of the alarm delivery process 250, the processor 118 will use the alarm prompt information stored within the media output device 102A to deliver the alarm prompt, as discussed above.

Auxiliary Device Examples

In some embodiments disclosed herein, it is desirable to include at least one additional electronic device in one of the processes described herein to further assure that the alarm prompt will be received by the user at the alarm event time. In one example, the alarm system 100 also includes one or more auxiliary media output devices 102B that are configured to communicate with the media output device 102A and/or the primary input device 105. As discussed above, an auxiliary media output device 102B can be in communication with the media output device 102A via the link 160 (FIG. 1) and/or be in communication with the primary input device 105 via the link 170. In some cases, a series of auxiliary media output devices 102B are used together to deliver the alarm prompt to a wider physical area than the area covered by the audible range of the media output device 102A and/or the primary input device 105.

FIG. 4 illustrates a process sequence 400 that is adapted to provide an alarm prompt to the user using the media output device 102A and at least one auxiliary media output device 102B, according to an embodiment disclosed herein. The process sequence 400 may include the process sequence 200, which is discussed above in conjunction with FIGS. 2 and 3, and an auxiliary device process sequence 410. For simplicity of discussion, one skilled in the art will note that FIG. 4 may include all of the steps shown in FIG. 2. One skilled in the art will also appreciate that the more detailed alarm delivery process 250 illustrated in FIG. 3 could also be used without deviating from the basic scope of the invention described herein. Therefore, a discussion of the details of each of the steps discussed above will not be repeated here, and only the differences or additional features of one or more of the steps will be discussed below.

Referring to FIG. 4, after performing steps 202 and 204, the configuration process 210 of the process sequence 400 will additionally include the completion of step 412 found in the auxiliary device process sequence 410, which is generally performed during step 206. At step 412, the primary input device 105 delivers at least a portion of the alarm prompt information to an auxiliary media output device 102B via the wired or wireless delivery link 170. Alternately, in some configurations, the alarm prompt information is provided to the auxiliary media output device 102B from the media output device 102A via the communication link 160. In this case, the alarm prompt may first be received by the media output device 102A, which is then retransmitted to one or more auxiliary media output devices 102B. The transfer of the alarm prompt information to an auxiliary media output device 102B may be initiated by the user input provided to the software program 109 running on the primary input device 105. In one example, the transferred information includes an audio file that is to be played when the alarm prompt is delivered, information relating to the optical or physical prompts that is to be played by the auxiliary media output device 102B, other alarm parameters (e.g., number of alarm repeats, length of time the alarm is to be played, alarm volume, etc.) and/or other control parameters that are to be used by the auxiliary media output device 102B.

Next, at step 414, the software program 109 running on the primary input device 105 may then optionally send a command to the auxiliary media output device 102B to assure that the information transferred in step 412 was received and/or it is stored within the memory 122 of the auxiliary media output device 102B. The primary input device 105 may receive the confirmation via a signal delivered via communication link 170. Alternately, the primary input device 105 may receive the confirmation signal via the communication link 140, since the auxiliary media output device 102B is in communication with the media output device 102A via communication link 160 and thus is not in direct communication with the primary input device 105. Confirmation may also be provided to the user by the delivery of an audio signal delivered through the speaker 128 of the auxiliary media output device 102B. If the confirmation is not received by the primary input device 105, the process sequence 410 may revert back to step 412 and/or provide a warning to the user via the GUI of the primary input device or an audio signal delivered to the user via the speaker 111. If the confirmation signal is received then the process sequence 410 will continue to step 416.

The information received during step 414 is stored within the memory 122 of the auxiliary media output device 102B during step 416. While not intended to be limiting as to the scope, in some embodiments, step 416 may begin during step 412 and be completed before step 418 is performed. In some cases, the information received during step 412 is stored as part of the stored media data 126 within the memory 122 of the auxiliary media output device 102B. In some cases the stored data may also include hard coded or other stored information provided by the user or media output device manufacturer relating to various attributes of the auxiliary media output device 102B (e.g., pairing information, EQ settings, etc.).

Next, at step 418, the processor 118 optionally determines if the auxiliary media output device 102B is in a desirable state to perform at least part of the process sequence 400 using a software application 124 stored in its memory 122, as similarly discussed above in conjunction with step 224. If it is determined that the auxiliary media output device 102B is not in a desirable state, a user warning (e.g., similar to warning 225) may be displayed on the GUI of the primary input device 105, or on the auxiliary media output device's 102B GUI, or an audible warning may be supplied by the auxiliary media output device 102B and/or primary input device 105. If it is determined that the auxiliary media output device 102B is in a desirable state, then the process sequence 400 will continue to step 420.

The processor 118 and timing device 120 will then work together to perform the task of determining when a desirable amount of time has passed and an alarm prompt needs to be generated, as illustrated in step 420 of FIG. 4. The determination of when a desirable amount of time has passed is based on the alarm prompt information that was received by the auxiliary media output device 102B during step 412. In one example, the timing process performed in step 420 includes the act of counting down from the time that the alarm prompt information is received to a desired alarm event time, as similarly discussed in conjunction with step 226.

In some embodiments, step 420 may also include one or more timing communication signals being sent between the media output device 102A and auxiliary media output device 102B using the communication link 160 to assure that the timing processes being performed by the media output device 102A (step 226) and being performed by the auxiliary media output device 102B (step 420) are synchronized. The one or more timing communication signals may include time reference information (e.g., time of day information) and/or information relating to the amount of time left until the alarm prompt is to be delivered.

After completing the step 420, the processing sequence 400 will then continue on to the alarm deliver phase of the process sequence 410, in which the alarm prompt is delivered by auxiliary media output device 102B to assure that the user receives the alarm prompt at a desired time. In some configurations, the alarm prompt may be delivered through the primary input device 105 and/or and auxiliary media output device 102B, as will be further discussed below. The alarm deliver process typically starts at step 422, in which the processor 118 of the auxiliary media output device 102B determines what information is to be delivered in the alarm prompt, and then deliver the alarm prompt at the desired alarm event time. During this step, the auxiliary media output device 102B may delivers the alarm prompt using the processes similarly discussed above in conjunction with step 254. Step 422 may optionally include the one or more alarm delivery communication signals being sent between the auxiliary media output device 102B and the media output device 102A using the communication link 160, so that the delivery of the alarm prompt is synchronized between these devices.

Next, at step 424, the auxiliary media output device 102B will optionally confirm that the alarm prompt has or is being delivered by the one or more components (e.g., speaker 128) in the auxiliary media output device 102B. If the alarm prompt is not delivered, or is not delivered in a desired way (e.g., volume is too low), then the process sequence 400 may revert back to step 422 and/or one or more alarm prompt output parameters (e.g., alarm volume, media data selection) may be automatically adjusted by the processor 118 of the auxiliary media output device 1026 to assure that the alarm prompt is delivered to the user in a desired way. One will note that the settings for the delivery of the alarm prompt can be hard coded into the memory 122 at the factory and/or can be provided to the auxiliary media output device 1026 by the user during the configuration process 210.

However, if the alarm prompt is delivered in a desired way, then the process sequence 410 may end, or the process sequence 410 may continue until input from the user has been received (step 490). Input from the user may include providing input to the auxiliary media output device 102B or providing input to the primary input device 105. If user input is not delivered in a desired period of time, then the process sequence 410 may revert back to steps 422 and 424. If user input is received, then the process sequence 410 may end and a notification signal may be sent to the media output device 102A (path 493) so that the alarm prompt can be halted on the media output device 102A and any other auxiliary media output devices 102B that are in communication with the media output device 102A.

Distributed Media Output Device and Auxiliary Media Output Device Configurations In some embodiments, process sequences 200 and 410 of the process sequence 400 can be performed by the audio device 102A and one or more auxiliary audio devices 102B, so that the interconnection between the primary input device 105, media output device 102A and one or more auxiliary media output devices 102B can be used to further increase the likelihood that the user will receive the alarm prompt at a desirable alarm event time. FIG. 5 illustrates a top view of building 500 that contains a primary input device 105, media output device 102A and four auxiliary media output devices 102B, which are all disposed in different rooms 505-509 of the building 500, and may benefit from the invention(s) disclosed herein.

In one example, during the steps completed during the configuration process 210 of the process sequence 400 the primary input device 105 is adapted to deliver the alarm prompt information to the media output device 102A via the communication link 140 (step 210) and the alarm prompt information to the auxiliary media output device 102B via the communication link 170 (FIG. 1), or serially along communication links 140 and 160 (step 412). In this case, during steps 206 and 412, the alarm prompt information may be delivered to the media output device 102A found in room 505 and to the auxiliary media output devices 102B found in rooms 506, 508 and 509. Next, after the media output device 102A has completed the steps found in process sequences 210, 220 and 250 and after each of the auxiliary media output devices 102B have completed the steps found in process sequences 410, they can each then perform step 290 or step 490, respectively. If during the completion of step 290 or step 490, a user input is received by one of the interconnected devices (e.g., primary input device 105, media output device 102A or one of the auxiliary media output devices 102B), then a user input received signal will be delivered back to other interconnected devices from the device that actually received the user input. The user input received signal, which may be transferred via one of the communication links 140, 160 or 170 between devices, and is thus used to cancel the alarm prompt on the other remaining devices that didn't receive the user input.

Alternately, in some embodiments of the process sequence 400, during step 290, the media output device 102A sends a communication signal to one or more auxiliary media output devices 102B when an alarm cancelling user input is not received at the media output device 102A or primary input device 105 within a desirable period of time. The length of the desired period of time may be set based on the user's input received during the configuration process 210 or it may be hard coded within the memory of the device. In one embodiment, if the user input is not received after a desired period of time during step 290, the process sequence 400 may continue from step 290 to step 419, and optionally step 421, via path 417.

At step 419, the processor 118 and/or software application 124 in the media output device 102A sends an auxiliary device control command to the auxiliary media output device 102B to cause an alarm prompt to be delivered from the auxiliary media output device 102B based on the processes performed at step 422 and any other desired subsequent steps in the process sequence 410. Thus, during step 419 the physical area over which the alarm prompt is delivered can be increased due to the distance between the media output device 102A and the auxiliary media output devices 102B, so that the user is more likely to receive the alarm prompt. Referring to FIG. 5, in one example, the auxiliary device control command is sent to each of the auxiliary media output devices 102B that the media output device 102A is able to communicate with via a communication link 160. Each of the auxiliary media output devices 102B that receive the auxiliary device control command signal may then perform at least steps 422 and 490. In one example, the auxiliary media output device 102B delivers alarm prompt information that is stored in its memory 122 during step 422. If user input is received at one of the auxiliary media output devices 1026 during the performance of step 490, then a user input received signal will be delivered back to media output device 102A via the communication link 160, so that the alarm prompt at the media output device 102A, primary input device 105 and/or other auxiliary media output devices 102B can be cancelled by the subsequent delivery of an alarm canceling signal provided from the media output device 102A.

Optionally, during step 419, the media output device may also perform step 421 in which the media output device 102A collects and delivers alarm prompt information, which was delivered to the device during the configuration process 210. The auxiliary media output device 102B can then use the latest and most update alarm prompt delivery information that the media output device 102A has, so the user's preferred alarm prompt will be provided at the alarm event time by the auxiliary media output device 102B.

In another embodiment of process sequence 400, if a user input is not received at the primary input device 105, media output device 102A or any of the auxiliary media output devices 102B, then an auxiliary device control command signal can be delivered to another auxiliary media output device 102C that is in communication with one of the auxiliary media output devices 102B via communication link 165 to further broaden the area covered by the alarm system 100 to increase the likelihood that the user will receive the alarm prompt at a desirable alarm event time. Each of the auxiliary media output devices 102C that receive the auxiliary device control command signal may then perform at least steps 422 and 490. This configuration may be useful in cases where the additional auxiliary media output device 102C may not be able to directly communicate with the media output device 102A, since the auxiliary media output device 102C may be out of communication range with the media output device 102A or the two devices are unable to communicate with each other (e.g., pair). Therefore, in some configurations of the alarm system 100, during the performance of steps 290 and/or 490, the alarm prompt can be serially delivered throughout all regions of the building 500 that contain a device that can communicated with the media output device 102A, auxiliary media output device 102B and/or auxiliary media output device 102C to increase the likelihood that the user will receive the alarm prompt at a desirable alarm event time.

Referring back to FIGS. 4 and 5, in some embodiments of the steps performed during the alarm delivery process 250, one or more of the interconnected network of media output devices (e.g., media output device 102A, auxiliary media output device 102B and auxiliary media output device 102C) can be used to communicate with the primary input device 105 to receive and perform one or more of the steps contained therein. In one example, at least one of the networked devices, other than the media output device 102A, are used to perform steps 300-390 with the primary input device 105. In some cases, after performing the desired portion of the alarm delivery process 250 with the primary input device 105, the media output devices 102B, 102C then transfer the information to the other devices that form the network, including the media output device 102A. In one example, if the user performs the configuration process 210 using the primary input device 105 and the media output device 102A, while the user is in room 505, but the user then subsequently moves the primary input device 105 to another room, such as the primary input device 105B positioned in room 507, the alarm delivery processes 250 can then be performed using the auxiliary media output devices 102C found in room 507. Then, subsequently the alarm delivery process 250 can also be completed using the other media output devices in the network, such as media output device 102A and auxiliary media output devices 102B, via one or more communication signals sent between these devices. In this case, all of the devices in the network can receive the latest alarm prompt information from the primary input device through the auxiliary media output device 102C, and thus not limiting the collection of the alarm delivery process 250 information via the use of media output device 102A.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of delivering audible information from one or more electronic devices, comprising:
   receiving, at a first media output device, alarm prompt information relating to a first time when a first audible output signal is to be generated by the first media output device;
   receiving, at a second media output device, at least a portion of the alarm prompt information received by the first media output device using a first wireless communication link that is formed between the second media output device and the first media output device;
   generating the first audible output signal from the first media output device upon reaching the first time; and
   generating a second audible output signal from the second media output device after receiving the at least a portion of the alarm prompt information, wherein
   the second audible output signal is derived from the received alarm prompt information, and
   the at least a portion of the alarm prompt information is sent by the first media output device to the second media output device in response to not receiving user input to cancel the generated first audible output signal within a first time period after the first time.

2. The method of claim 1, wherein the alarm prompt information comprises audio information and a device control command.

3. The method of claim 2, wherein
the alarm prompt information further comprises a media file, and
the generating the first audible output signal further comprises generating a sound based on at least a portion of the information contained within the media file using the first media output device.

4. The method of claim 2, further comprising:
calculating the difference between a time when the alarm prompt information is received by the first media output device and a time when an alarm event is to occur;
receiving power information relating to an amount of power stored in one or more batteries in the first media output device; and
determining that the amount of power stored in the one or more batteries is enough to perform the step of generating the first audible output signal when the alarm event is to occur.

5. The method of claim 4, further comprising sending a notification to the second media output device if the amount of power is less than required to perform the step of generating the first audible output signal.

6. The method of claim 1, further comprising:
sending a command signal from the first media output device to an input device; and
receiving media information from the input device after sending the command signal, wherein the media information comprises at least a portion of a media file.

7. The method of claim 1, further comprising:
entering event information into a software application running on an input device; and
storing at least a portion of the event information in a memory of the input device,
wherein the alarm prompt information, received by the first media output device, comprises the event information entered into the input device.

8. The method of claim 1, further comprising:
sending a first command signal from the first media output device to the second media output device, wherein the first command signal is adapted to cause a software application on the second media output device to set an auxiliary alarm that is set to occur when an alarm event is to occur in time.

9. A method of delivering audible information from one or more electronic devices, comprising:
receiving, at a first media output device, alarm prompt information relating to a first time when a first audible output signal is to be generated by the first media output device;
receiving, at a second media output device, at least a portion of the alarm prompt information received by the first media output device using a first wireless communication link that is formed between the second media output device and the first media output device;
generating the first audible output signal from the first media output device upon reaching the first time;
generating a second audible output signal from the second media output device upon reaching the first time, wherein the second audible output signal is derived from the alarm prompt information received by the second media output device; and
receiving, at a third media output device, at least a portion of the alarm prompt information received by the second media output device using a first wireless communication link that is formed between the third media output device and the second media output device, wherein
the at least a portion of the alarm prompt information received at the third media output device is sent by the second media output device to the third media output device in response to not receiving user input to cancel the generated first audible output signal or the generated second audible output signal within a first time period after the first time.

10. The method of claim 9, wherein the alarm prompt information further comprises a device control command.

11. The method of claim 9, wherein
the alarm prompt information further comprises a media file, and
the generating the first audible output signal further comprises generating a sound based on at least a portion of the information contained within the media file using the first media output device.

12. The method of claim 9, further comprising:
calculating the difference between a time when the alarm prompt information is received by the first media output device and a time when an alarm event is to occur;
receiving power information relating to an amount of power stored in one or more batteries in the first media output device; and
determining that the amount of power stored in the one or more batteries is enough to perform the step of generating the first audible output signal when the alarm event is to occur.

13. The method of claim 12, further comprising sending a notification to the second media output device if the amount of power is less than required to perform the step of generating the first audible output signal.

14. The method of claim 9, further comprising:
sending a command signal from the first media output device to an input device; and
receiving media information from the input device after sending the command signal, wherein the media information comprises at least a portion of a media file.

15. The method of claim 9, further comprising:
entering event information into a software application running on an input device; and
storing at least a portion of the event information in a memory of the input device,
wherein the alarm prompt information, received by the first media output device, comprises the event information entered into the input device.

16. The method of claim 9, further comprising:
sending a first command signal from the first media output device to the second media output device, wherein the first command signal is adapted to cause a software application on the second media output device to set an auxiliary alarm that is set to occur when an alarm event is to occur in time.

17. The method of claim 1, further comprising:
receiving, at a third media output device, at least a portion of the alarm prompt information received by the first media output device using a first wireless communication link that is formed between the third media output device and the first media output device, wherein
the at least a portion of the alarm prompt information received at the third media output device is sent by the first media output device to the third media output device in response to not receiving user input to cancel the generated first audible output signal within a first time period after the first time; and generating a third audible output signal from the third media output device after receiving the at least a portion of the alarm prompt information at the third media output device.

18. The method of claim 9, wherein the third media output device is located outside of a communication range of the first media output device, and the third media output device is located within of a communication range of the second media output device.

* * * * *